United States Patent
Berger et al.

(10) Patent No.: US 10,131,247 B2
(45) Date of Patent: Nov. 20, 2018

(54) UNDERBODY UNIT FOR A MOTOR VEHICLE

(71) Applicant: Dr. Ing. h.c. F. Porsche Aktiengesellschaft, Stuttgart (DE)

(72) Inventors: Dennis Berger, Bietigheim-Bissingen (DE); Reyk Bienert, Eberdingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 14/805,510

(22) Filed: Jul. 22, 2015

(65) Prior Publication Data

US 2016/0023689 A1 Jan. 28, 2016

(30) Foreign Application Priority Data

Jul. 22, 2014 (DE) .................... 10 2014 110 307

(51) Int. Cl.
*B62D 25/20* (2006.01)
*B60L 11/18* (2006.01)
(Continued)

(52) U.S. Cl.
CPC ............ *B60L 11/1877* (2013.01); *B60K 1/04* (2013.01); *B60L 11/1874* (2013.01);
(Continued)

(58) Field of Classification Search
CPC .............. B60L 11/1877; B60L 11/1874; B60L 11/1875; B60L 11/187; B60K 1/04; B60K 2001/005; B60K 2001/0438; B62D 25/20
See application file for complete search history.

(56) References Cited

U.S. PATENT DOCUMENTS 5,641,031 A 6/1997 Riemer et al.
5,833,023 A 11/1998 Shimizu
(Continued)

FOREIGN PATENT DOCUMENTS

DE 4412450 10/1995
DE 102012009322 11/2012
(Continued)

OTHER PUBLICATIONS

Japanese Office Action dated Jul. 27, 2016.

*Primary Examiner* — Brian L Swenson
(74) *Attorney, Agent, or Firm* — Gerald E. Hespos; Michael J. Porco; Matthew T. Hespos

(57) ABSTRACT

An underbody unit for a motor vehicle body has a floor body (12) connectable to the motor vehicle body for dissipating static and/or dynamic loads. Reinforcing ribs (14) protrude up from the floor body (12). The reinforcing ribs (14) together with the floor body (12) delimit receiving pockets (16) for receiving battery cell units (18) of a traction battery for driving the motor vehicle. First and second connections (34, 36) supply and remove a refrigerating agent for cooling the floor body (12). The battery cell units (18) are above the floor body (12) and can be inserted into the underbody unit (10). Thus, the underbody unit (10), the reinforcing ribs (14) and the connections (34, 36) for the refrigerating agent define a supporting plate that can support the heavy battery cell units (18), form armor plating for protection and a heat exchanger for active and/or passive cooling.

9 Claims, 3 Drawing Sheets

(51) Int. Cl.
  *B60K 1/04* (2006.01)
  *B60K 1/00* (2006.01)
(52) U.S. Cl.
  CPC .......... *B60L 11/1875* (2013.01); *B62D 25/20* (2013.01); *B60K 2001/005* (2013.01); *B60K 2001/0438* (2013.01)

(56) References Cited

U.S. PATENT DOCUMENTS

| | | | | |
|---|---|---|---|---|
| 5,875,643 | A * | 3/1999 | Kanai | B60H 1/00878 62/279 |
| 6,227,322 | B1 * | 5/2001 | Nishikawa | B60R 16/04 180/65.1 |
| 7,824,797 | B2 | 11/2010 | Nishino | |
| 8,403,090 | B2 * | 3/2013 | Fujiwara | H01M 2/1077 180/68.5 |
| 8,409,743 | B2 * | 4/2013 | Okada | H01M 2/1077 429/120 |
| 8,409,749 | B2 | 4/2013 | Nishino | |
| 8,623,537 | B2 | 1/2014 | Kim et al. | |
| 8,696,051 | B2 * | 4/2014 | Charbonneau | B62D 21/157 296/187.12 |
| 8,733,487 | B2 | 5/2014 | Usami | |
| 8,875,828 | B2 * | 11/2014 | Rawlinson | B60K 1/04 180/68.5 |
| 9,172,071 | B2 * | 10/2015 | Yoshioka | B60K 1/04 |
| 2009/0186266 | A1 | 7/2009 | Nishino | |
| 2010/0190044 | A1 | 7/2010 | Nishino | |
| 2011/0045333 | A1 | 2/2011 | Kim et al. | |
| 2012/0018238 | A1 | 1/2012 | Mizoguchi et al. | |
| 2012/0055725 | A1 * | 3/2012 | Mizoguchi | B60K 1/04 180/68.5 |
| 2012/0097466 | A1 | 4/2012 | Usami | |
| 2012/0263984 | A1 * | 10/2012 | Krammer | H01M 2/12 429/82 |
| 2012/0286541 | A1 | 11/2012 | Kashiwagi | |
| 2013/0040175 | A1 * | 2/2013 | Yang | B60L 11/1874 429/83 |
| 2013/0192807 | A1 * | 8/2013 | DeKeuster | B60L 11/1874 165/170 |
| 2014/0246259 | A1 | 9/2014 | Yamamura et al. | |
| 2015/0090426 | A1 * | 4/2015 | Hirsch | B60L 1/006 165/64 |
| 2015/0135939 | A1 * | 5/2015 | Rawlinson | F41H 7/042 89/36.08 |
| 2015/0171492 | A1 | 6/2015 | Ramsayer et al. | |
| 2016/0172726 | A1 * | 6/2016 | Enning | H01M 10/625 429/120 |

FOREIGN PATENT DOCUMENTS

| | | |
|---|---|---|
| JP | 2008105645 A | 5/2008 |
| JP | 2009087737 A | 4/2009 |
| JP | 2009134936 A | 6/2009 |
| JP | 2010050000 A | 3/2010 |
| JP | 2011006051 A | 1/2011 |
| JP | 2011175911 A | 9/2011 |
| JP | 2011198688 A | 10/2011 |
| JP | 2012091635 A | 5/2012 |
| WO | 2010136861 | 12/2010 |
| WO | 2013/051638 | 4/2013 |

\* cited by examiner

UNDERBODY UNIT FOR A MOTOR VEHICLE

CROSS REFERENCE TO RELATED APPLICATION

This application claims priority under 35 USC 119 to German Patent Appl. No. 10 2014 110 307.6 filed on Jul. 22, 2014, the entire disclosure of which is incorporated herein by reference.

BACKGROUND

1. Field of the Invention

The invention relates to an underbody unit for a motor vehicle that contributes to reinforcement of a body of the motor vehicle.

2. Description of the Related Art

A body of a motor vehicle can have a load-bearing supporting structure that includes solidly designed longitudinal members connected to solidly designed crossmembers to form a stable supporting frame or platform to which the remaining components of the motor vehicle can be connected. The supporting structure can support a drive, individual body parts, functional units of the motor vehicle and a payload and can dissipate the weight of these components onto an underlying surface. A plate-like underbody unit can be connected to the supporting structure to reinforce the supporting structure and the motor vehicle body. The underbody unit forms the underbody of the motor vehicle and covers and protects constructional units arranged above the underbody unit from the underlying surface.

WO 2013/051638 A1 discloses a battery housing of a traction battery that is connected from below to an underbody of a motor vehicle. The battery housing has a thin cast aluminum wall that faces the underlying surface and outwardly protruding cooling ribs.

There is a constant need to increase the service life of a motor vehicle traction battery. Accordingly, it is an object of the invention to present measures that will increase the service life of a motor vehicle traction battery.

SUMMARY OF THE INVENTION

The invention relates to an underbody unit for reinforcing a body of a motor vehicle between a front axle and a rear axle. The underbody unit includes a floor body that is connectable to the motor vehicle body for dissipating static and/or dynamic loads of the motor vehicle body. Reinforcing ribs protrude substantially vertically up from the floor body. The reinforcing ribs and the floor body delimit receiving pockets for receiving at least one battery cell unit of a traction battery for driving the motor vehicle in hybrid form and/or purely electrically. A first connection is provided for supplying a refrigerating agent and a second connection for removal of the refrigerating agent. The refrigerating agent may be $CO_2$ or other medium that is suitable for a refrigerating circuit having a compressor evaporator, condenser and throttle member for cooling the floor body.

The reinforcing ribs enable the underbody unit to be sufficiently stable and stiff to absorb and dissipate static and dynamic loads that occur during operation of the motor vehicle thereby reinforcing a supporting structure of the motor vehicle body with little use of material. The floor body can be a trough with reinforcing ribs projecting into the volume of the trough. The reinforcing ribs may run in longitudinal and transverse directions of the motor vehicle and can intersect one another to form substantially rectangular receiving pockets. At least some of the reinforcing ribs are connected to laterally outer side walls of the floor body. The side walls can delimit the volume spanned by the trough. The battery cell units can be inserted from above into the receiving pockets.

The reinforcing ribs of the floor body reinforce the underfloor unit and the motor vehicle body, and also receive and cool the battery cell units, thereby carrying out plural functions simultaneously. The underfloor element and the reinforcing ribs enable the underbody unit to form a supporting base for a battery housing of a traction battery. The reinforcing ribs also conduct away heat from the battery cell units to the floor body. The floor body can be cooled with the aid of the refrigerating agent supplied and removed via the connections. Thus, the battery cell units will not be overheated and damaged by heat that is not removed. As a result, the floor body is used for reinforcing the underbody unit and the motor vehicle body, and also is used as a heat exchanger for cooling the battery cell units. Simultaneously, the solidly designed floor body can dissipate the loads to be anticipated during operation of the motor vehicle and in the event of a crash. As a result, the floor body can serve as armor plating for the battery cell units so that the battery cell units are protected against damage by the underlying surface, for example if the motor vehicle is placed onto an obstacle protruding up from the underlying surface. The refrigerating agent can be introduced at a pressure that is dependent on the corresponding refrigerating agent without there being any concern that the floor body will buckle. The cooling capacity of the refrigerating agent thus can be increased without adversely affecting the structural integrity of the underbody unit. As a result, the floor body can carry out plural functions simultaneously. Arranging the battery cell units above the underbody unit in a lower region of the motor vehicle enables the underbody unit to be part of an armor-plated battery housing, a supporting base and a heat exchanger. The underbody unit enables the battery cell units of the traction battery to be inserted above the floor body into the underbody unit. As a result, the underbody unit, the reinforcing ribs and the connections for the refrigerating agent define a supporting plate of a battery housing that can support the heavy battery cell units, can define protective armor plating and can function as a heat exchanger for active and/or passive cooling. Therefore, a motor vehicle traction battery in a lower region of the motor vehicle can have a long service life.

The floor body can extend in the transverse direction of the motor vehicle, in particular between a maximally far right and a maximally far left longitudinal member of a supporting structure of the motor vehicle body. At a distance D of the center lines of the right and left longitudinal members, in particular $1.10 \leq d/D \leq 0.80$, preferably $1.00 \leq d/D \leq 0.90$ and particularly preferably $0.98 \leq d/D \leq 0.95$ applies to the extent d of the floor body in the transverse direction. All of the battery cell units may be arranged between the left and right longitudinal members. The left and right longitudinal members may cover at least part of the battery cell units, as viewed in the transverse direction, and therefore the right and left longitudinal members can serve as armor plating for the battery cell units in the event of a side crash of the motor vehicle. The floor body can extend in the longitudinal direction of the motor vehicle between the front axle and the rear axle of the motor vehicle. Given a wheel base A between the front axle and the rear axle, in particular $1.10 \leq a/A \leq 0.30$, preferably $1.00 \leq a/A \leq 0.40$, furthermore preferably $0.90 \leq a/A \leq 0.50$ and particularly preferably $0.80 \leq a/A \leq 0.60$ applies for the extent a of the floor body in the longitudinal direction. The floor body and/or the reinforcing ribs may be produced from an aluminum material, preferably by aluminum casting. The floor body may be connected to a frame-shaped housing part and/or a housing cover to encapsulate the traction battery formed by the battery cell units and to protect same against external influences. The floor body is connected here with the aid of suitable sealing means, with sufficient tightness to the frame-shaped housing part and/or the housing cover that substantially no refrigerating agent can escape during operation. For this purpose, the floor body has a correspondingly large wall thickness, for example, in the region of the contact points with the sealing means, with the frame-shaped housing part and/or with the housing cover. The floor body may have at its upwardly facing end in the region of its outer walls, a flange that is closed in the circumferential direction to form a sufficiently large wall thickness for an adequate sealing effect for retaining the refrigerating agent.

The refrigerating agent can be conducted through the underbody unit via the first and second connections to control the temperature of the battery cell units directly or indirectly for cooling or heating. The refrigerating agent may be a gas, for example $CO_2$. The first connection and the second connection can be connected to lines of a cooling system and/or a refrigerating circuit. A cold refrigerating agent can be introduced into the underfloor unit via the first connection. The cooling medium is heated in the underfloor unit and, in the heated state, leaves the underbody unit via the second connection. The second connection can be connected outside the underbody unit to the first connection via a cooler and a compressor to form a cooling circuit. The refrigerating agent can be conveyed in the circuit with the aid of the compressor.

A cooling channel may be formed in the floor body and may extend between the first and second connections for removing heat from the battery cell units and for outputting that heat to the floor body and/or to the reinforcing ribs. The cooling channel can define a predetermined course of the cooling medium through the underbody unit. Forming the cooling channel in the floor body itself avoids the need for separate cooling hoses.

The cooling channel may be formed completely within the floor body. The at least one cooling channel can be configured, for example, as a bore through the solid material of the floor body. As a result, the cooling channel can be formed automatically in a liquid-tight manner for the liquid refrigerating agent. For example, cooling channels can run in the longitudinal direction and in the transverse direction and can intersect. End openings in the cooling channels that are not required for the connections can be closed in a liquid-tight manner. Running the cooling channel completely within the floor body avoids direct contact of the refrigerating agent with the energy cell units in the receiving pockets, and therefore an electric short circuit cannot occur via the refrigerating agent.

The floor body may be an evaporator for the at least partial evaporation of the refrigerating agent. The floor body can thereby act at the same time as an evaporator plate. A correspondingly high cooling capacity can be achieved within the underbody unit by means of the phase change of the refrigerating agent from the liquid into the gaseous state. The refrigerating agent can be introduced in the liquid state via the first connection into the underbody unit and can be conducted away in the gaseous state via the second connection so that the refrigerating agent can be liquefied outside the underbody unit. Furthermore, the cooling system that is connected via the connections can be simplified. In particular, a common refrigerating agent can be use for the underbody unit and the cooling system, and therefore heat exchange between the refrigerating agent used for the floor unit and a refrigerating agent used for the cooling system is not required, and/or just a single conveying unit, in particular compressor or pump, is sufficient for the circulation process of the cooling system.

The floor body may have a left fastening flange for fastening to a left longitudinal member of a supporting structure of the motor vehicle body and a right fastening flange for fastening to a right longitudinal member of the supporting structure. As a result, the underbody unit can be connected directly to the supporting structure of the motor vehicle body and, via the material of the floor body, can dissipate static and/or dynamic loads that occur. A frame-shaped intermediate housing and/or a housing cover of a battery housing can be connected to the floor body in a vertical extension of outer side walls of the floor body. Additionally or alternatively, parts of the battery housing can be connected to the respective fastening flange. As a result, fastening means need not be provided in the side walls, and therefore, an upper side of the side walls can be used to form liquid-tight sealing of the battery housing. Furthermore, the horizontally protruding fastening flange can act as a cooling rib in order to remove heat of the battery cell units. This heat can be absorbed by the floor body, convectively and/or by heat conduction to the longitudinal members.

The reinforcing ribs may be formed integrally with the floor body, thereby ensuring good heat conduction between the reinforcing ribs and the floor body without thermal resistances at phase limits with respect to separate components connected in between. Furthermore, the production and the installation can be simplified.

A heating element for heating the floor body and/or the reinforcing ribs may be provided, and may be embedded in a corresponding depression of the floor body. The heating element can heat the material of the floor body, which, in turn, can heat the battery cell units. As a result, the underbody unit can cool and heat the battery cell units. Heating may control the temperature of the battery cell units to a suitable operating temperature when outside temperatures are low. Thus, it is possible to regulate the temperature of the battery cell units to a target temperature for achieving high efficient and a long service life.

The invention further relates to a traction battery for driving a motor vehicle in hybrid form and/or purely electrically. The traction battery has battery cell units inserted in a battery housing. The battery housing has a support plate that supports the battery cell units and that is coupled thermally to the battery cell units. The support plate may be the above-described underbody unit for reinforcing a motor vehicle body of a motor vehicle. The battery cell units of the traction battery can be inserted above the solidly designed floor body into the underbody unit. As a result, the underbody unit functions as a supporting plate of the battery housing and can support the heavy battery cell units with the aid of the reinforcing ribs and the connections for the refrigerating agent. The underbody unit also functions as armor plating for protecting the battery cell units and as a heat exchanger for actively and/or passively cooling the battery cell units. Therefore it is possible for a motor vehicle traction battery in a lower region of the motor vehicle to have a long service life.

The invention further relates to a motor vehicle comprising a motor vehicle body with a load-bearing supporting structure and a traction battery that is connected to the supporting structure on a lower side of the motor vehicle body. The supporting structure can be designed and developed as described above for reinforcing the motor vehicle body.

The invention is explained by way of example below using preferred exemplary embodiments with reference to the attached drawings, wherein the features illustrated below, in each case individually and also in combination, can constitute one aspect of the invention.

DETAILED DESCRIPTION

Figure 1:
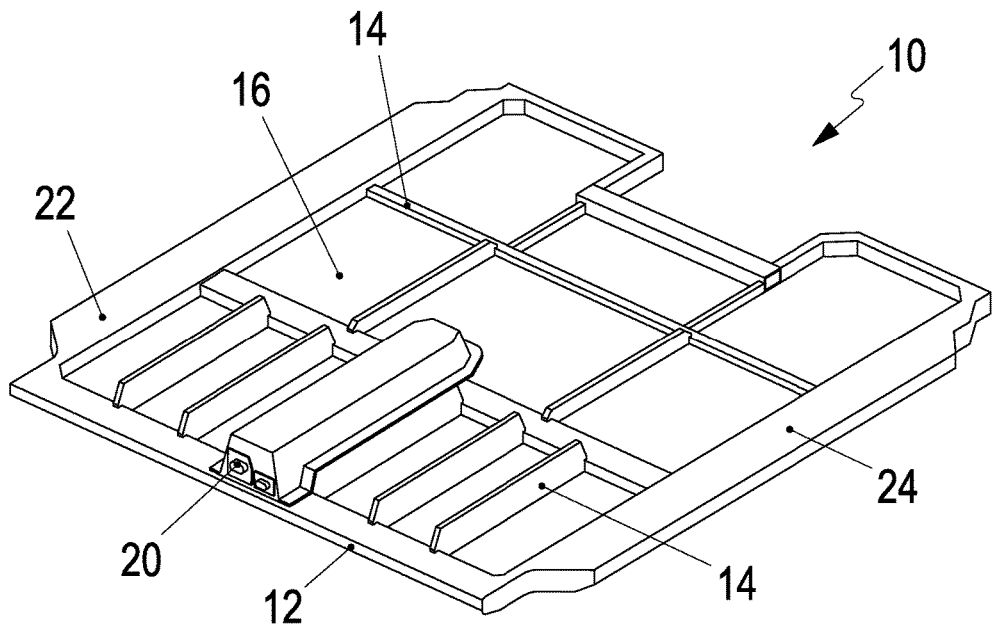
FIG. 1 is a schematic perspective view of an underbody unit.
Figure 2:
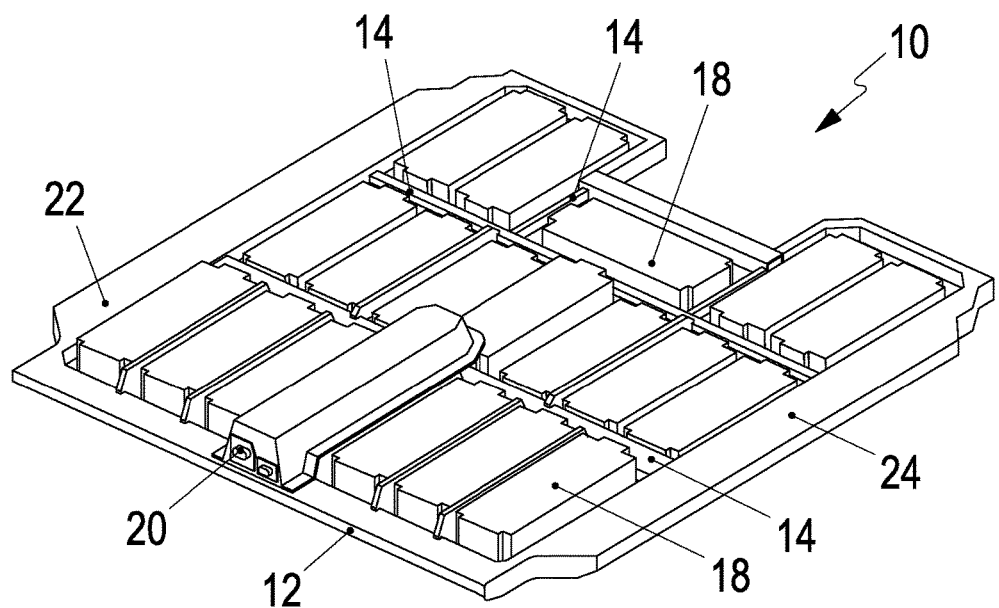
FIG. 2 is a schematic perspective view of the underbody unit from FIG. 1 with battery cell units inserted.

An underbody unit 10 is illustrated in FIG. 1 and is configured to reinforce a motor vehicle. The underbody unit 10 has a floor body 12 that is of solid configuration. Reinforcing ribs 14 protrude integrally up from the floor body 12 and run in the longitudinal and transverse directions. Receiving pockets 16 are formed between the intersecting reinforcing ribs 14 and outer side walls of the floor body 12. Battery cell units 18 can be inserted into the receiving pockets 16 from above to form a traction battery, as shown in FIG. 2. The battery cell units 18 are connected electrically to one another and can output stored electrical energy via an electric connection 20 and/or can absorb and store electrical energy produced mechanically by a drive train of the motor vehicle. Left and right fastening flanges 22 and 24 protrude laterally from the floor body 12 and enable the underbody 10 to be fastened to left and right longitudinal members of a supporting structure of a motor vehicle body of the motor vehicle.

Figure 3:
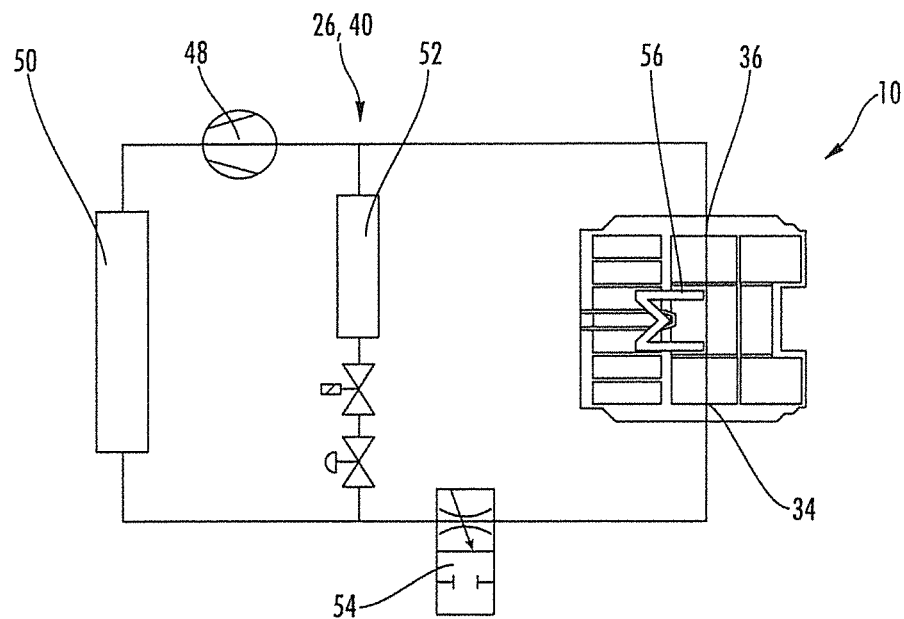
FIG. 3 is a schematic illustration of an embodiment of a cooling system for the underbody unit from FIG. 1.
Figure 4:
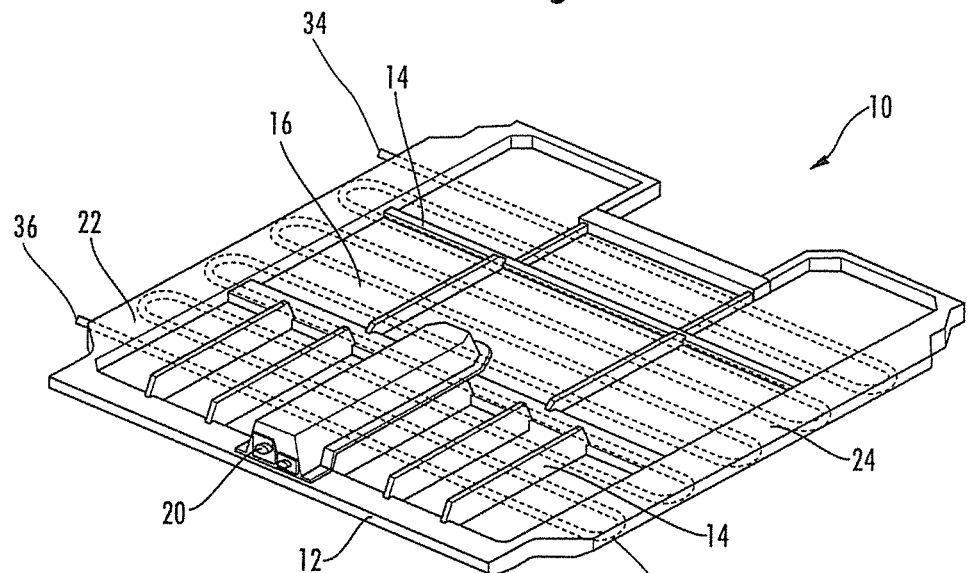
FIG. 4 is a schematic perspective view of the underbody unit of FIG. 1 showing the cooling channel in broken lines.
Figure 5:
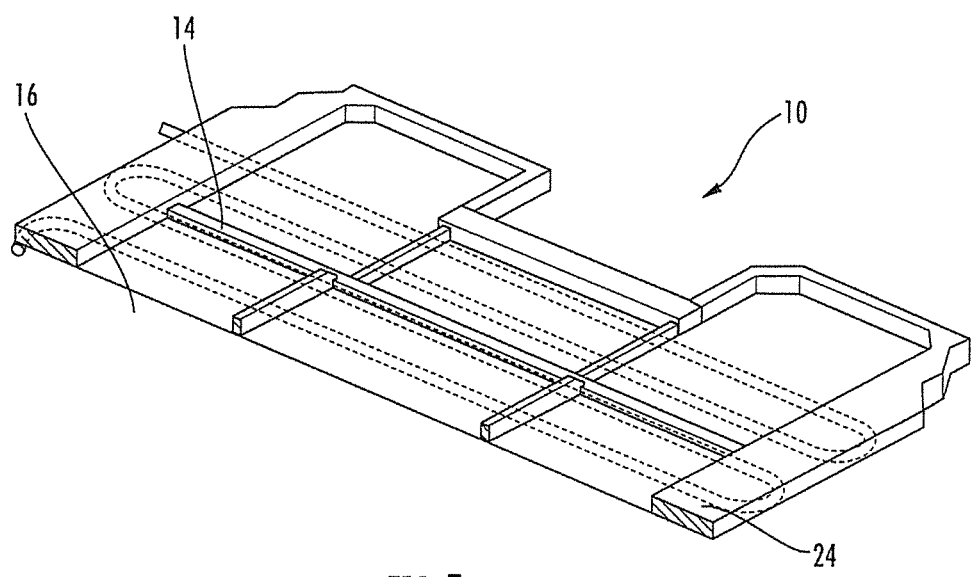
FIG. 5 is a schematic perspective view of the underbody unit of FIG. 1 in cross-section showing the cooling channel in broken lines.

As illustrated in FIG. 3, the underbody unit 10 can be cooled by a cooling system 26. The refrigerating agent coming from cooling system 26, in particular in a liquid state, can be introduced into the underbody unit via a first connection 34. The heat output by the battery cell units 18 can be output to the refrigerating agent via the reinforcing ribs 14 and the floor body 12. The refrigerating agent can be evaporated in the process and can change into the gaseous state, as a result of which a correspondingly high cooling capacity is achieved on account of the evaporation energy required. The heated, in particular gaseous, refrigerating agent can leave the underbody unit 10 via a second connection 36 and can be recycled to the cooling system 26. A cooling channel 38 may be formed in the floor body 12 and may extend between the first and second connections 34, 36 for removing heat form the battery cell units and for outputting that heat to the floor body 12 and/or reinforcing ribs 14. The cooling channel 38 can define a predetermined course of the cooling medium through the underbody unit 10.

In the exemplary embodiment illustrated, the cooling system 26 is embodied as a refrigerating plant 40 where the refrigerating agent can be liquefied and cooled. In the refrigerating plant 40, the refrigerating agent can be supplied in the gaseous state by a compressor 48 to a condenser where the refrigerating agent condenses. The liquid refrigerating agent can be recycled via an evaporator 52 and/or can be supplied via a switchable expansion valve 54 to the underbody unit 10 at a sufficiently low temperature when cooling is required. A flow of the refrigerating agent to the underbody unit 10 can be interrupted with the aid of the switchable expansion valve 54, and therefore cooling of the battery cell units can be switched off when required, for example, in order to avoid unnecessary recirculation of the refrigerating agent and to save energy. For the (pre-)heating of the battery cell units 18, a heating element 56 can be integrated in the floor body 12.

The underbody unit 10 can thereby be used as an evaporator for the refrigerating agent of the cooling system 26, which consists only of the refrigerating plant 40. As a result, it is not necessary to provide a separate evaporator in the cooling system, and therefore the cooling system 26 can thereby be constructed significantly more simply. As a result, the floor body 12 of the underbody unit 10 can be integrated directly into the refrigerating circuit of the refrigerating plant 40 without having to provide a heat transfer between refrigerating agents which are separated from one another.

What is claimed is:

1. An underbody unit for reinforcing a motor vehicle body of a motor vehicle between a front axle and a rear axle, comprising:
   a solid floor body formed integrally from metal and being connectable to the motor vehicle body for dissipating static and/or dynamic loads of the motor vehicle body,
   upwardly protruding reinforcing ribs integral with the floor body, the reinforcing ribs including a first plurality of reinforcing ribs extending in a longitudinal direction of the motor vehicle and a second plurality of reinforcing ribs extending in a transverse direction of the motor vehicle, the reinforcing ribs in the first plurality of the reinforcing ribs intersecting the reinforcing ribs in the second plurality of the reinforcing ribs to define a plurality of rectangular receiving pockets,
   cooling channels bored or cast to extend through the solid floor body;
   a first connection for accommodating an in-flow of a refrigerating agent into the cooling channels and for cooling the floor body and the reinforcing ribs;
   a second connection for accommodating an outflow of the refrigerating agent from the cooling channels;
   battery cell units of a traction battery for the driving the motor vehicle accommodated in the receiving pockets and supported on the solid floor body, wherein
   the battery cell units are cooled by the floor body, and heat from the battery cell units is output to the second connection via the outflow of the refrigerating agent.

2. The underbody unit of claim 1, wherein the first and second connections communicate with the cooling channel for removing heat from the battery cell units and outputting the heat to the floor body and to the reinforcing ribs and to areas of the floor body between the reinforcing ribs.

3. The underbody unit of claim 2, wherein the cooling channels are formed completely within the floor body.

4. The underbody unit of claim 1, wherein the floor body is an evaporator for the at least partial evaporation of the refrigerating agent.

5. The underbody unit of claim 1, wherein the floor body has left and right fastening flanges for fastening respectively to left and right longitudinal members of a supporting structure of the motor vehicle body.

6. The underbody unit of claim 1, further comprising a heating element embedded in the floor body for heating the floor body and/or the reinforcing ribs.

7. The underbody unit of claim 1, wherein the refrigerating agent is $CO_2$.

8. A traction battery for driving a motor vehicle in hybrid form and/or purely electrically, comprising: the underbody unit of claim 1 configured to form a battery housing; and a plurality of battery cell units inserted in the battery housing of the underbody unit.

9. A motor vehicle comprising the underbody unit of claim 1, and further comprising an evaporator connected in parallel with the cooling channels, a compressor, a condenser connected in series with the compressor, and valves for selectively placing the compressor and the condenser in communication with at least one of the evaporator and the cooling channels, wherein the valves are operated to direct at least part of the refrigerating agent to the cooling channels so that the cooling channels function as a second evaporator and cool the battery cell units when needed.

\* \* \* \* \*